Feb. 27, 1945. O. H. PETERSEN 2,370,576
CONTROL AND INDICATING APPARATUS
Filed March 11, 1944
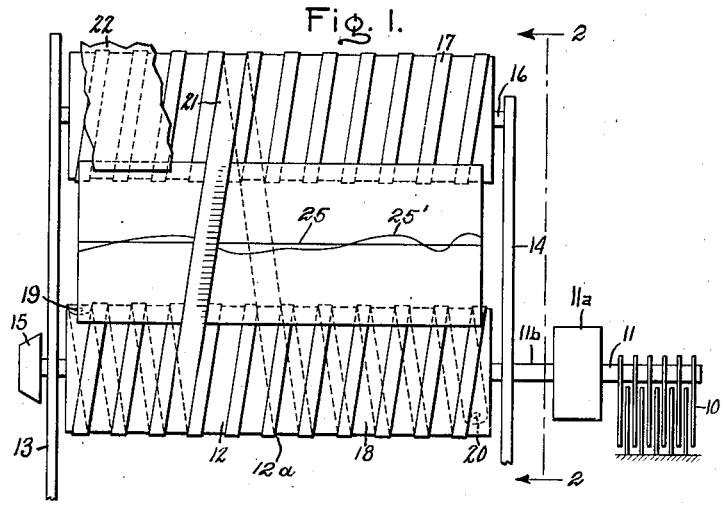
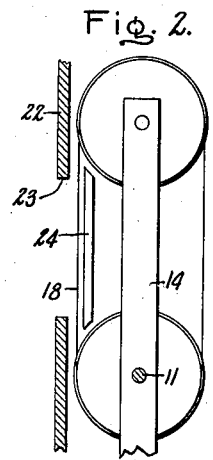
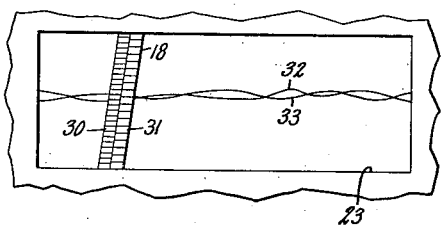
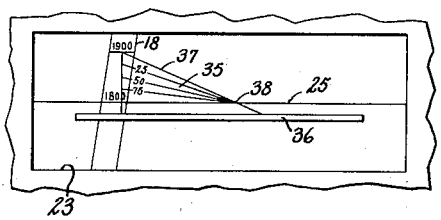
Inventor:
Otto H. Petersen,
by Harry E. Dunham
His Attorney.

Patented Feb. 27, 1945

2,370,576

UNITED STATES PATENT OFFICE 2,370,576

CONTROL AND INDICATING APPARATUS

Otto H. Petersen, Schenectady, N. Y., assignor to General Electric Company, a corporation of New York Application March 11, 1944, Serial No. 526,099

7 Claims. (Cl. 116—124.1)

My invention relates to variable control and indicating apparatus generally and, more particularly, to variably positionable control apparatus having a scale for indicating the value of a controlled function with a high degree of accuracy. The invention is particularly applicable to radio or other electric apparatus, such as highly refined variable impedance elements for precise control of frequency and the like, especially where such an element has a long indicating scale and a non-linear characteristic of the controlled function with respect to position.

In radio control apparatus, such as frequency selecting apparatus and the like, it is customary to utilize variable circuit elements, such as variable condensers and the like, which are designed and built to exhibit as nearly as possible a linear characteristic of the controlled function with respect to the position of the element. While it has been found possible to attain a fair degree of linearity in such controlling elements, particularly in frequency determining condensers, inductances and the like, it has been found entirely impracticable to attain the degree of linearity necessary in commercial radio transmitting and receiving apparatus. Accordingly, it has been found necessary to calibrate individually the indicating scale of each such circuit controlling element. Such calibration has heretofore been effected either by marking individually the dial of each variable condenser or the like, or by stamping the dials with standard markings and making up a separate calibration chart for each instrument. While it is highly desirable from a manufacturing viewpoint to be able to stamp standard scale markings upon the control element, the constant reference to a separate calibration chart is extremely inconvenient.

A further difficulty encountered in highly accurate variable circuit elements for commercial radio apparatus is that the indicating scales frequently are of such length as to render a planar dial of inconvenient size. Heretofore, such scales have been spirally arranged upon rotatable drums with means for effecting relative longitudinal movement between the drums and a viewing window. Such an arrangement, however, is mechanically complicated and does not simplify the problem of calibration.

Accordingly, it is one object of my invention to provide a new and improved position indicating apparatus having a long scale arranged compactly for continuous viewing of only a small operative portion of the scale.

It is a further object of my invention to provide such a compact indicating apparatus which does not necessitate a follow-up mechanism between the scale and the viewing apparatus.

It is another object of my invention to provide a compact long scale control apparatus having a standard linear scale and means associated with, but physically independent of, the scale for calibrating the apparatus.

It is a specific object of my invention to provide an indicator for a non-linear control element having standard scale markings and easily calibrated means directly associated with the scale for correcting for non-linearity of the controlling element.

In accordance with my invention, the relatively long scale of a precise circuit controlling element, such as a variable condenser, is spirally wound upon a rotatable drum operatively connected to the controlling element. In order to obviate the necessity for a follow-up mechanism between the spiral scale and the viewing window, the scale is marked upon a tape spirally wound upon the drum and having at least one turn looped over a second rotatable drum disposed in parallel spaced relation with the first drum. The desired indication may now be obtained through a fixed viewing window extending for substantially the full length of the rotatable drums and interposed therebetween, so that a portion of the common turn between the drums is continuously exposed to view through the window. If desired, a screen may be placed behind the front side of the common turn to conceal the rear side of the turn. To give an indication, a fixed reference line may be drawn upon or otherwise associated with the viewing window. For greater precision, the indicating tape may be provided with standard linear markings and the device calibrated for non-linearity of the controlling member with respect to position by marking upon the viewing window an irregular reference line the shape of which is indicative of the non-linear characteristic of the controlling member.

My invention itself will be more fully understood and its objects and advantages further appreciated by referring now to the following detailed specification taken in conjunction with the accompanying drawing in which Fig. 1 is a side elevation, partly in section, of a control and indicating apparatus embodying my invention; Fig. 2 is an end view of the apparatus shown in Fig. 1 taken along the line 2—2 of Fig. 1; Fig. 3 is a fragmentary view of a similar indicating apparatus embodying my invention in another form; and Fig. 4 is a fragmentary view of the apparatus of Fig. 1 illustrating a further use thereof.

Referring now to the drawing, and particularly to Figs. 1 and 2, I have shown by way of illustration a preferred embodiment of my invention applied to indicate the frequency determined by a variable control condenser 10. It will of course be understood that the condenser 10 is suitably connected in a frequency determining circuit of a radio apparatus or the like. The movable portion of the condenser 10 is mounted upon a rotatable shaft 11 which is connected by suitable gearing 11a to a shaft 11b carrying a rotatable drum 12. The shaft 11b carrying the drum 12 is journaled in suitable fixed supports 13 and 14 and carries at one end a suitable driving member, such as a control knob 15, arranged to change the position of the condenser 10 and simultaneously to rotate the drum 12. The fixed supports 13 and 14 also have journaled therein a shaft 16 arranged in parallel spaced relation to the shaft 11 and carrying a rotatable idler drum 17 of substantially the same diameter and length as the drum 12.

The driving drum 12 has helically wound thereon an indicating tape 18. Preferably the tape 18 is wound in a helical groove 12a in the drum 12, as clearly shown at Fig. 1. The tape 18 is connected at both ends to the drum 12, as at 19 and 20, and has a single turn 21 looped over the idler drum 17 having a similar helical groove on its surface. It will be understood that while only one turn over the idler drum 17 is necessary, two or more turns may, if desired, be looped over the drum 17. Preferably, the indicating tape 18 is made of metal having a low temperature coefficient of expansion. If desired for greater accuracy, any temperature variation in the length of the tape may be counteracted by selecting for the tape and the drums materials such that any change in the circumference of the drums multiplied by the number of turns of the tape will equal, or nearly equal, the change in the length of the tape.

While in the illustrated embodiment it is contemplated that the single turn 21 of the tape 18 over the idler drum 17 will drive the drum 17, it will of course be understood that if desired the drums 12 and 17 may be geared together and that either drum may be used as the driving drum.

The rotatable drums 12 and 17 may suitably be mounted behind a fixed panel 22 having a window or viewing aperture 23 therein extending for substantially the full length of the drums 12 and 17 and arranged to expose to view the portion of the turn 21 between the two rolls. Preferably, an opaque screen or mask 24 is disposed behind the window 23 and behind the front side of the turn 21 in order to conceal from view the working parts of the mechanism and the rear side of the turn 21. If desired, the window 23 may be covered with glass or the like transparent material, and a suitable reference line 25 may be marked either upon the glass window or upon the screen 24. It will be understood that the traveling tape 18 carries suitable indicia to indicate, in conjunction with the reference line 25, the frequency determined by the position of the variable condenser 10.

In operation, the control knob 15 attached to the shaft 11b is rotated to control the frequency determining condenser 10 and simultaneously to rotate the drums 12 and 17. As the drums are rotated, the indicia upon the moving tape 18 move vertically past the horizontal reference line 25.

It will be understood that, as the drums rotate, the common turn 21 progresses longitudinally of the reference line and that, while this longitudinal movement is not used by way of indication, it is this movement which renders it necessary to make the viewing aperture 23 substantially coextensive with the drums 12 and 17.

If now it is assumed that the variable condenser 10 has a slightly non-linear frequency characteristic with respect to position, the accuracy of the device may be improved by calibrating the indicator for frequency at a plurality of points. For simplicity of manufacture, it is desirable that the frequency markings upon the movable tape 18 be linear, so that tapes with standard markings may be used upon any one of a number of similar devices. To correct for the error introduced by the non-linearity of the condenser 10, it is only necessary to construct by test an irregular reference line 25' having a shape corresponding to the frequency characteristic of the condenser 10. Thus, as the spiral tape progresses longitudinally of the viewing aperture 23, the frequency determined by the condenser 10 is accurately indicated by the frequency mark upon the tape 18 at the point where the irregular reference line 25' crosses the tape.

The device which I have described is also useful for indicating the value of a function within a plurality of separate bands or ranges of variation of the controlled function. For example, at Fig. 3, I have shown the viewing screen and movable tape of a variable frequency control and indicating apparatus operable over two separate frequency bands. In such case, it is only necessary to provide the movable tape 18 with multiple sets of indicating marks 30 and 31 and to provide upon the viewing screen separate reference lines 32 and 33 for cooperation, respectively, with the sections 30 and 31 of the tape. If desired, the sections of the tape and the cooperating reference lines may be marked in separate, but corresponding, colors. It will of course be understood that the invention is equally applicable to more than two frequency bands.

At Fig. 4, I have illustrated an interpolating device useful in connection with my invention for accurately determining and directly reading values of frequency intermediate the markings on the movable tape 18. In the device of Fig. 4, it is assumed that the reference line 25 is straight. The markings upon the tape 18 may be either linear or non-linear. In order to interpolate between markings, a transparent or translucent triangular member 35 is slidably mounted upon a track 36 parallel to or coincident with the reference line 25. The transparent member 35 defines an angle between the reference line 25 and the upper edge 37 of the member 35 and the angle thus defined is suitably sub-divided by indicating lines terminating at a point 38 where the edge 37 intersects the reference line 25. Let it now be assumed by way of example that the tape 18 is marked only in hundred kilocycle divisions, and that it is desired to set the tape at the proper position to obtain a frequency of 1825 kilocycles. The control condenser is first positioned so that the 1800 kilocycle mark on the tape lies along the reference line 25. The interpolating device 35 is then moved longitudinally along the reference line 25 until the upper edge 37 intersects the 1900 kilocycle mark, as shown at Fig. 4. In order now to obtain a setting of 1825 kilocycles, the condenser is moved backward until the 1900 kilocycle mark on the tape crosses the line marked "25" on the interpolating device 35.

It will be evident from Fig. 4 that the interpolating device is not limited in its application to use with linearly marked scales on the tape. If the scale marked on the tape is non-linear, correct interpolation is still provided so long as the upper edge 37 of the transparent member 35 is brought into alignment with the marking on the tape next above the marking opposite the reference line 25.

While I have described only a preferred embodiment of my invention by way of illustration, many modifications will occur to those skilled in the art and I therefore wish to have it understood that I intend in the appended claims to cover all such modifications as fall within the true spirit and scope of my invention.

What I claim as new and desire to secure by Letters Patent of the United States is:

1. An indicating apparatus comprising a pair of rotatable drums disposed in parallel spaced relation, a calibrated tape helically wound upon one of said drums and having at least one common turn looped over the other of said drums, and fixed reference means intermediate said drums and continuously operable in conjunction with a portion of at least one of said common turns.

2. An indicating apparatus comprising a base, a pair of rotatable drums disposed in parallel spaced relation, a calibrated tape helically wound upon one of said drums and having at least one common turn looped over the other of said drums, said base being apertured between said drums and longitudinally for substantially the full length of said drums continuously to expose to view at least one side of one of said common turns, and fixed reference means visible through said aperture and operable in conjunction with said one side of said one common turn to indicate the position of said tape.

3. In combination a fixed panel, a movable control member, a pair of rotatable drums disposed in parallel spaced relation adjacent said panel, means connecting at least one of said drums for rotation in accordance with movement of said control member, a calibrated tape helically wound upon one of said drums and having one turn looped over the other of said drums, a viewing window in said panel extending longitudinally for substantially the full length of said drums and interposed therebetween continuously to expose to view at least one side of said one turn of tape, and a fixed reference line associated with said window to indicate upon said calibrated tape the position of said control member.

4. An electric control apparatus comprising a variably positionable member arranged to control an electrical function, said function having a non-linear characteristic with respect to the position of said member, a pair of rotatalbe drums disposed in parallel spaced relation, means connecting at least one of said drums for rotation in accordance with movement of said member, a linearly calibrated tape helically wound upon one of said drums and having one turn looped over the other of said drums, and a non-linear fixed reference line disposed between said drums and extending for substantially their full length to indicate upon said scale the value of said electrical function at selectable positions of said member.

5. A radio control apparatus comprising a movable frequency controlling member having a non-linear frequency-position characteristic, a pair of rotatable drums mounted in parallel spaced relation, means connecting at least one of said drums for rotation in accordance with movement of said frequency controlling member, a calibrated tape helically wound upon one of said drums and having at least one common turn looped over the other of said drums, and fixed reference means including a non-linear reference line operable in conjunction with one side of at least one of said common turns between said drums to indicate the frequency determined by said member.

6. A radio control apparatus comprising a selectably positionable frequency controlling member, a pair of rotatable drums mounted in parallel spaced relation, means connecting at least one of said drums for rotation in accordance with the movement of said positionable member, a calibrated tape helically wound upon one of said drums and having one turn looped over the other of said drums, a fixed viewing screen interposed between the sides of said one turn and extending longitudinally for substantially the full length of said drums continuously to expose to view one side of said one turn, and a fixed reference line associated with said screen to indicate upon said tape the frequency determined by positioning of said frequency controlling member.

7. A radio control apparatus comprising a fixed panel, a selectably positionable frequency controlling member having a non-linear frequency-position characteristic, a pair of rotatable drums mounted in parallel spaced relation adjacent said panel and operatively connected for movement with said positionable member, a linearly calibrated tape helically wound upon one of said drums and having one turn looped over the other of said drums, a viewing aperture in said panel extending longitudinally for substantially the full length of said drums and interposed therebetween continuously to expose to view one side of said one turn, and an irregular reference line having a shape determined by said frequency-position characteristic and associated with said viewing aperture to indicate upon said tape the frequency determined by selectable positioning of said member.

OTTO H. PETERSEN.